United States Patent [19]

Fujieda et al.

[11] Patent Number: 4,627,312
[45] Date of Patent: Dec. 9, 1986

[54] AUTOMATIC TRANSMISSION

[75] Inventors: Mamoru Fujieda, Tomobe; Yoshishige Oyama, Katsuta, both of Japan

[73] Assignee: Hitachi, Ltd., Tokyo, Japan

[21] Appl. No.: 762,327

[22] Filed: Aug. 5, 1985

[30] Foreign Application Priority Data

Aug. 10, 1984 [JP] Japan .................. 59-166438

[51] Int. Cl.$^4$ .................. B60K 41/18; F16H 5/46
[52] U.S. Cl. .................. 74/866; 74/336 R; 364/424.1
[58] Field of Search .................. 74/866, 336 R, 337; 364/424.1

[56] References Cited

U.S. PATENT DOCUMENTS

| | | | |
|---|---|---|---|
| 3,709,068 | 1/1973 | Mohri | 74/866 |
| 4,304,155 | 12/1981 | Want et al. | 74/866 |
| 4,497,222 | 2/1985 | Nagaoka et al. | 74/336 R X |
| 4,517,859 | 5/1985 | Nagaoka et al. | 74/336 R X |
| 4,519,484 | 5/1985 | Nagaoka et al. | 74/336 R X |

FOREIGN PATENT DOCUMENTS

| | | | |
|---|---|---|---|
| 2217482 | 11/1973 | Fed. Rep. of Germany | 74/866 |
| 788405 | 10/1935 | France | 74/336 |
| 2117462 | 10/1983 | United Kingdom | 364/424.1 |

OTHER PUBLICATIONS

"Automation of Mechanical Transmission" (Nagaoka, et al.) of "Preliminary Reports 822" of Seminars of Association of Automotive Technique, no date.
"Microcomputer Mechanical Clutch and Transmission Control", Watanabe et al., SAE 840055, Feb. 1984.

Primary Examiner—Kenneth J. Dorner
Assistant Examiner—Dirk Wright
Attorney, Agent, or Firm—Antonelli, Terry & Wands

[57] ABSTRACT

On an input and an output shafts of the transmission, there are provided a plurality of gear pairs which have different reduction ratios. One of the gears of the gear pair having the smallest reduction ratio is operably connected with the input shaft through a multi-disk clutch, and the torque transmitted from the input shaft to the gear can be controlled by adjusting the thrusting force applied to the clutch. When the selection of the gear pair is changed, the gear pair under operation at present is brought into the neutral condition and, at the same time, the thrusting force of the clutch is increased. Thereby, the torque of the input shaft is transmitted to the output shaft through the clutch and a rotational synchronism of the input and output shafts is advanced by adjusting the thrusting force. When the rotational synchronism is completed, the gear pair to be selected is brought under the operation.

7 Claims, 12 Drawing Figures 4,627,312

AUTOMATIC TRANSMISSION

BACKGROUND OF THE INVENTION 7

1. Field of the Invention

The present invention relates to an automatic transmission for an automobile and, more particularly, to an automatic transmission using a gear type transmission.

2. Description of the related Art

There is an increasing demand for an automobile having an automatic transmission, and a torque converter is often used at present for the demand. Although various improvements are added to the torque converter so far, however, it is well known that it has a higher fuel consumption than a gear type transmission because of a lower power transmission efficiency. In order to solve this problem, automatic transmission systems using the gear type transmission are studied. One of these systems is disclosed in the papers of the international conference held at Detroit, in February, 1984, "Microcomputer Mechanical Clutch and Transmission Control", Watanabe et al., SAE 840055, in which the clutch and the throttle valve must be operated at a speed change, i.e. the gear shift of the transmission. In the method which is disclosed in "Automation of Mechanical Transmission" (Nagaoka et al.) written down in "Preliminary Reports 822" of Seminars of Association of Automotive Technique, not the clutch but the throttle valve is operated at a speed change to synchronize the input and output shafts of the transmission in the revolutions per minute thereby to mesh the gears. Since, when the gears are to be meshed, the rotational synchronism almost depends on the effect of operating the throttle valve, however, it takes relatively long time for the completion of the rotational synchronism of the input shaft with the output shaft. Any of the concepts disclosed, therefore, has a defect that the time for the gear shift operation of the transmission is elongate to make the running speed liable to fluctuate.

SUMMARY OF THE INVENTION

An object of the present invention is to provide an automatic transmission which is enabled to effect automatic speed change of a gear type transmission without operating the throttle valve during the gear shift operation.

The present invention is characterized in that a torque transmitting means the degree of the transmission of which is controllable is provided between an input and an output shafts of the automatic transmission and the gear shift operation thereof is conducted when the rotational synchronism between the shafts is completed by the controllable torque transmission operation of the torque transmitting means.

DESCRIPTION OF THE PREFERRED EMBODIMENT

Figure 1:
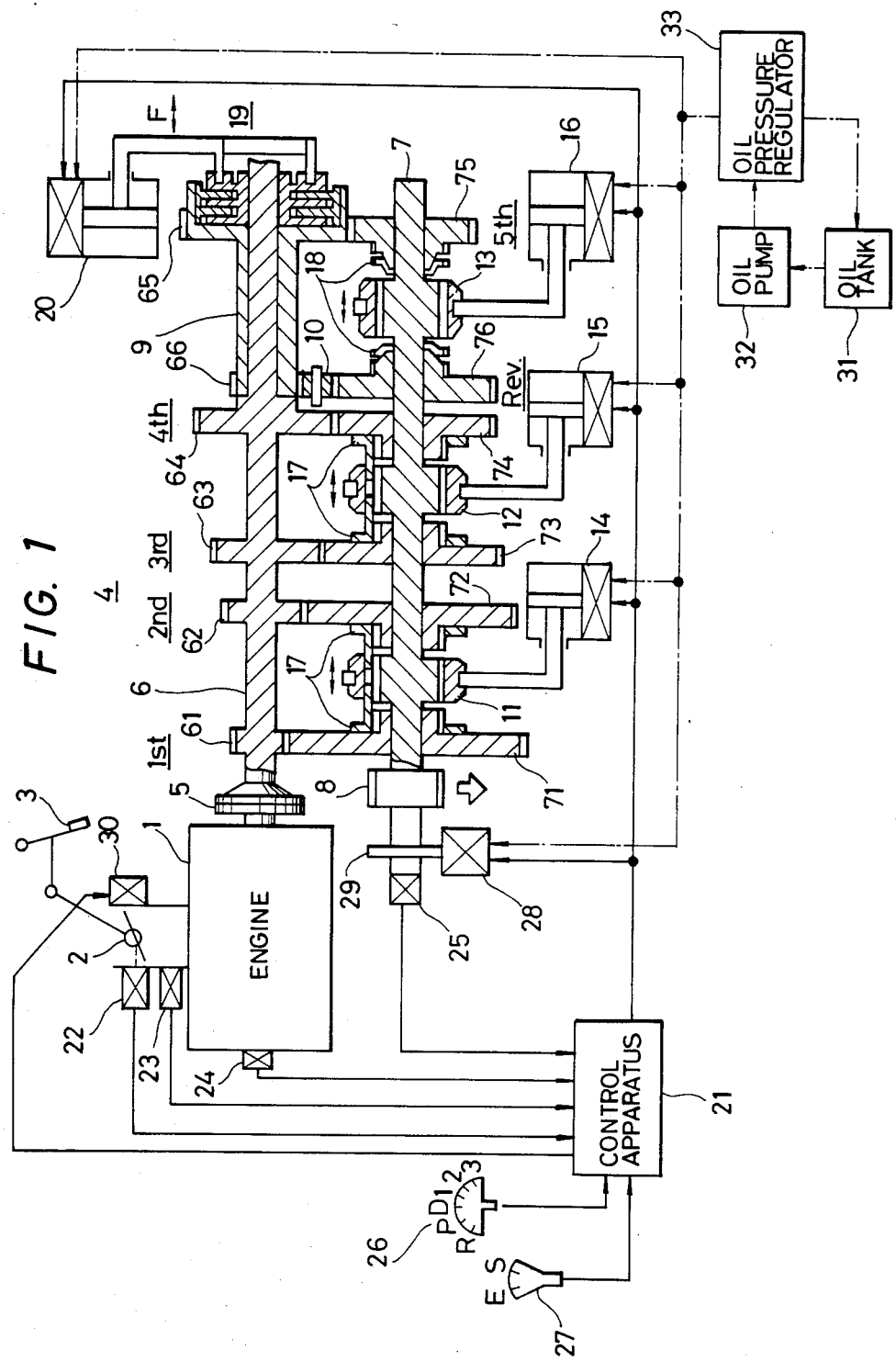
FIG. 1 is a view showing the overall construction of the embodiment of the present invention.

FIG. 1 shows a schematic view of the overall construction of the automatic transmission according to an embodiment of the present invention. In this figure, an engine 1 has a throttle valve 2, which is worked by a driver through an accelerator pedal 3. The output of the engine 1 is transmitted to a transmission 4. A damper clutch 5 is provided between the engine 1 and the transmission 4 so as to absorb or damp the pulsation of the output torque produced by the engine 1.

The transmission 4 has two shafts 6 and 7. The shaft 6 is called an input shaft and connected to the engine 1 through the damper clutch 5. The shaft 7 is called an output shaft and supplies the output of the transmission 4 for wheels (not shown) through a final reduction gear 8. On the shafts 6 and 7, there are provided plural gears. The gears 61, 62, 63 and 64 are fixed on the shaft 6 and the gears 65 and 66 are provided on a cylindrical shaft 9 which is rotatable free from the shaft 6. The gear 71, 72, 73, 74, 75 and 76 are arranged on the shaft 7 and rotatable independently therefrom.

The gears 61, 62, 63, 64 and 65 are coupled with the gears 71, 72, 73, 74 and 75, respectively, so that the gears 61 and 71, 62 and 72, 63 and 73, 64 and 74, and 65 and 75 are formed a gear pair. The gear 66 is coupled with the gear 76 through a gear 10 which is used for transmitting the torque to the shaft 7 in the rotational direction opposite to that of the shaft 6. A set of gears 66, 76 and 10 is, therefore, used for the purpose of the reverse running of the automobile.

The respective gear pairs have a predetermined reduction ratio. The gear pair 61 and 71 has the largest ratio and the gear pair 65 and 75 has the smallest one. The remaining gear pairs 62 and 72, 63 and 73, and 64 and 74 have a suitable reduction ratio in order between the largest and the smallest.

The gears 71, 72, 73, 74, 75 and 76 are selectively coupled operably with the shaft 7 by the movement of sleeves 11, 12 and 13. When the sleeve 11 moves leftward, the gear 71 is operably coupled with the shaft 7. Accordingly, the output of the engine 1 is transmitted from the shaft 6 to the shaft 7 by means of the gear pair 61 and 71 with the reduction ratio determined thereby. This condition is usually called "the first speed position" of the transmission 4, and further it is referred to as "first sleeve ON" in the description later, especially in the drawings in order to indicate the first speed position by the leftward movement of the sleeve 11.

Contrary, when the sleeve 11 moves rightward, then the coupling of the gear 71 and the shaft 7 is released and the gear 72 is operably connected with the shaft 7 ("the second speed position") In view of the movement of the sleeve 11, a series of the movements above are referred to as "first sleeve OFF" and "second sleeve ON". The output of the engine 1 at this time is transmitted from the shaft 6 to the shaft 7 with the reduction ratio determined by the gear pair 62 and 72 for the second speed position.

The same is true of the sleeves 12 and 13. When the sleeve 12 moves leftward, the gear 73 is selected ("third sleeve ON" and "the third speed position"), and when it moves rightward, the gear 74 becomes operable ("fourth sleeve ON" and "the fourth speed position"). The gear 75 is operably coupled with the shaft 7 by the movement of the sleeve 13 to the right hand ("F sleeve ON" and "the fifth speed position"). When the sleeve 13 moves leftward, the gear 76 is selected ("R sleeve ON" and "the reverse position").

The movement of the sleeves 11, 12 and 13 is completed by gear shift actuators 14, 15 and a forward-reverse (F-R) switching actuator 16. Further, as is well known, the coupling or selection of the gears stated above can be done smoothly by the cooperation of balk rings 17 and a synchromesh mechanism 18.

Now, in a case of the selection of the fifth speed and the reverse positions, the torque of the shaft 6 is not directly transmitted from the gears 65 and 66 to the gears 75 and 76, because of the free rotation of the cylindrical shaft 9 from the shaft 6 as stated before. The operation of a torque transmitting mechanism 19 such as a multi-disk clutch becomes necessary in order to convey the torque of the shaft 6 to the shaft 7 through the gear pair 65 and 75 and the reverse gear set 66, 76 and 10.

The multi-disk clutch 19 itself is known. Namely, it comprises a plurality of first disks which rotate with the shaft 6 and a plurality of second disks which are positioned between the first disks and rotate with the cylindrical shaft 9, i.e. the gears 65 and 66. In the multi-disk clutch 19 with such structure, the degree of the torque transmitted from the shaft 6 to the cylindrical shaft 9 can be controlled by adjusting the slips between the first and the second disks. The adjustment of the slip can be done by varying the thrust F acting on the disks of the clutch 19, which is given by a clutch actuator 20.

The control of the various actuators 14, 15, 16 and 20 is achieved by a control apparatus 21 the control operation of which will be described in detail later. To the control apparatus 21, there are inputted as signals indicating the running state of the automobile, the output of a throttle valve opening sensor 22, the output of an intake pressure sensor 23, the output of a sensor 24 of the number of revolutions of the engine 1 and the output of a sensor 25 attached to the output shaft 7. The sensor 25 is assumed to be a DC generator which has its output $V_N$ changing in polarity in dependence upon the direction of the revolutions so that the rotational direction of the shaft 7 can be discriminated. As signals for inputting the will of the dirver, moreover, there are also inputted a signal of a reverse range R, parking range P, drive range D, first speed range, second speed range or third speed range from a running mode select lever 26, and a signal of an economy drive E or sporty drive S from an E-S switching lever 27.

As output signals, on the other hand, there are outputted operation signals to the gear shift actuators 14, 15, the F-R switching actuator 16 and the clutch actuator 20. The control apparatus 21 also outputs the signal to a parking brake actuator 28, which applies the braking force to a brake disk 29 provided on the shaft 7. Further, the control apparatus 21 sends an output signal to a controller 30 for a by-pass valve of the throttle valve 2.

The aforementioned respective actuators 14, 15, 16, 20 and 28 are hydraulically driven and are connected with an oil pressure generating apparatus which is composed of an oil tank 31, an oil pump 32 and an oil pressure regulator 33. In FIG. 1, the oil pressure circuit is shown by the dash and dotted line.

The operation of the transmission system constructed above will be described, referring to FIGS. 2 to 5.

Figure 2:
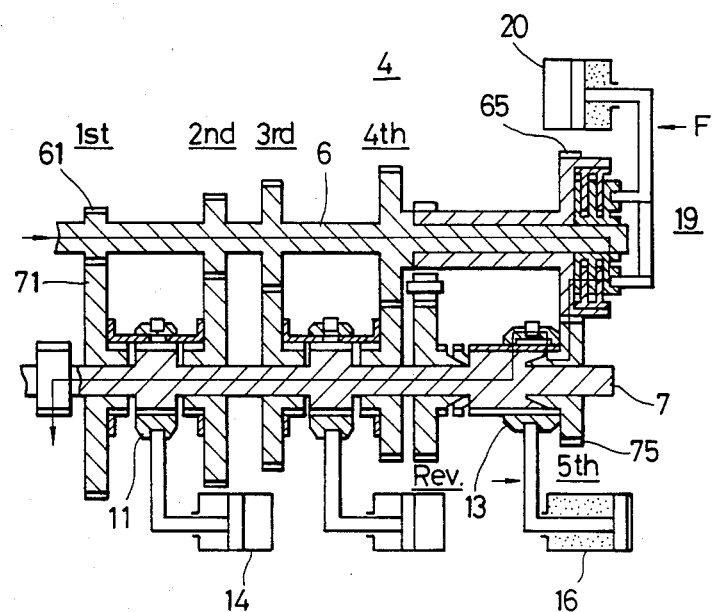
FIGS. 2 to 5 are views for explaining the operations of the mechanical portion of the embodiment shown in FIG. 1.

First of all, FIG. 2 is an explanatory view showing the operation at a start in case the driver shifts the running mode selector 26 to the drive range D for the starting operation. In this Figure, only the elements relating to the explanation hereinafter are accompanied with the same reference numerals as in FIG. 1.

When the starting condition holds, the actuator 16 moves the sleeve 13 rightward to operably connect the gear (for the fifth speed) 75 with the output shaft 7. Since, at this time, the multi-disk clutch 19 is released, the connection can be effected independently of the states (i.e., the presence and direction of the revolutions) by means of a synchromesh type synchronizer 18 used from the past.

Here, if the oil pressure is gradually supplied to a cylinder of the actuator 20, the rotating force of the input shaft 6 is transmitted through the friction disks of the multi-disk clutch 19 and further from the gear 65 made integral with the multi-disk clutch 19 to the gear 75 so that the output shaft 7 operably connected to the gear 75 by the sleeve 13 is rotated to start the run of the automobile. Here, the transmission torque $T_D$ of the multi-disk clutch 19 is expressed by:

$$T_D = \mu F$$

wherein
 $\mu$: the slip factor of the friction disks of the multi-disk clutch 19; and
 F: the thrust acting upon the friction disks by the actuator 20.

By controlling the thrust F, i.e. the operating pressure produced by the actuator 20 in response to the number of revolutions of the input shaft 6 and the output shaft 7, therefore, the number of revolutions of the output shaft 7 can be controlled in accordance with the loads (the state of the road, the weight of the automobile body and so on).

The engine output at this time has the transmission path of the input shaft 6—the friction disks of the clutch 19—the gear 65—the gear 75—the sleeve 13—the output shaft 7, as shown in the figure by the thin line. Hence, as the thrust F becomes higher, the running speed of the automobile increases. As the speed of the automobile increases, the ratio Ne/N becomes smaller, wherein Ne denotes the number of revolutions of the engine 1 (i.e. equal to the input shaft 6) and N the number of revolutions of the output shaft 7 (i.e. proportional to the running speed of the automobile). The difference in the number of revolutions of the input shaft 6 and the output shaft 7 is absorbed as a slip between the friction disks of the multi-disk clutch 19.

Figure 3:
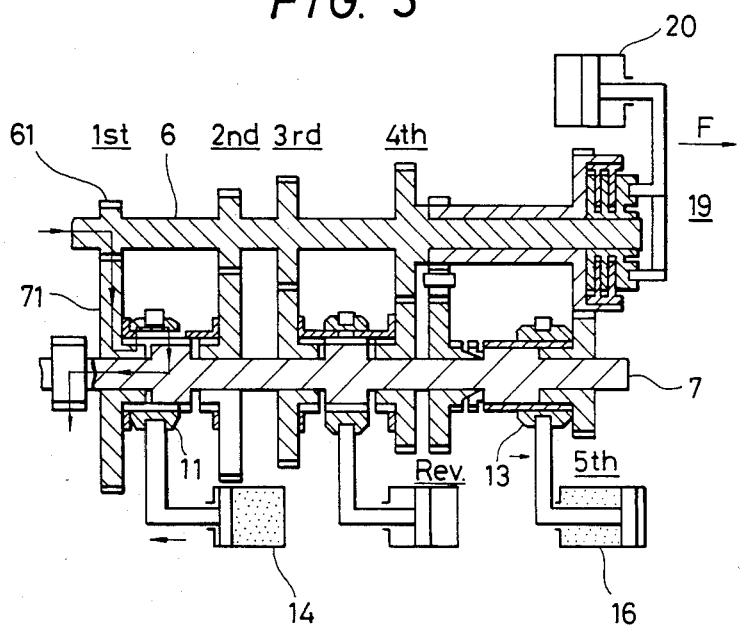

When the ratio Ne/N becomes substantially equal to the reduction ratio of the first speed position of the transmission 4 which is determined by the gear pair 61 and 71, the pressured oil is supplied to the actuator 14 to move the sleeve 11 leftward from the neutral position ("first sleeve ON"). Thereby the gear 71 is operably connected with the output shaft 7, as shown in FIG. 3. If the connection of the gear 71 and the output shaft 7 is completed, the pressure oil supply to the actuator 14 is stopped. As a result, the engine output has the transmission path of the input shaft 6—the gear 61—the gear 71—the sleeve 11—the output shaft 7, as shown in the figure by the thin line. Thus, the first-speed running is effected.

Next, the explanation will be made with respect to the case in which the running state is shifted from the firstspeed running of FIG. 3 to a second-speed running. When the running speed reaches the predetermined speed for shifting the position of the transmission 4, the sleeve 11 is returned to the neutral position ("first sleeve OFF") to release the connection between the gear 71 and the output shaft 7. Simultaneously with this, the pressure oil is supplied to the actuator 20 to transmit the engine output through the gear pair 65 and 75 to the output shaft 7 by the friction disks of the clutch 19. This condition is the same as that shown in FIG. 2.

By the increasing force F in the multi-disk clutch 19, the engine output is transmitted to the axle so that it is consumed for accelerating the automobile body. At the same time, the number of revolutions of the engine 1 is dropped, because the load upon the engine 1 becomes high by using the gear pair 65 and 75 having the lowermost reduction ratio. s a result, the ratio of the number of revolutions between the output shaft 7 (or the running speed) and the input shaft 6 approaches the reduction ratio for the second speed position of the transmission 4, namely the reduction ratio of the gear pair 62 and 72 which is smaller than that of the gear pair 61 and 71. The engine output at this time has the transmission path of the input shaft 6—the friction disks of the clutch 19—the gear 65—the gear 75—the sleeve 13—the output shaft 7 like the starting operation shown in FIG. 2.

When, according to the increase of the running speed of the automobile, the ratio of the number of revolutions of the input shaft 6 and the output shaft 7, i.e. Ne/N stated before, becomes almost equal to the reduction ratio of the second speed position of the transmission 4 which is determined by the gear pair 62 and 72, the pressure oil is supplied to the actuator 14 to move the sleeve 11 rightward from the neutral position. Thereby, the gear 72 is operably connected with the output shaft 7 ("second sleeve ON").

Figure 4:
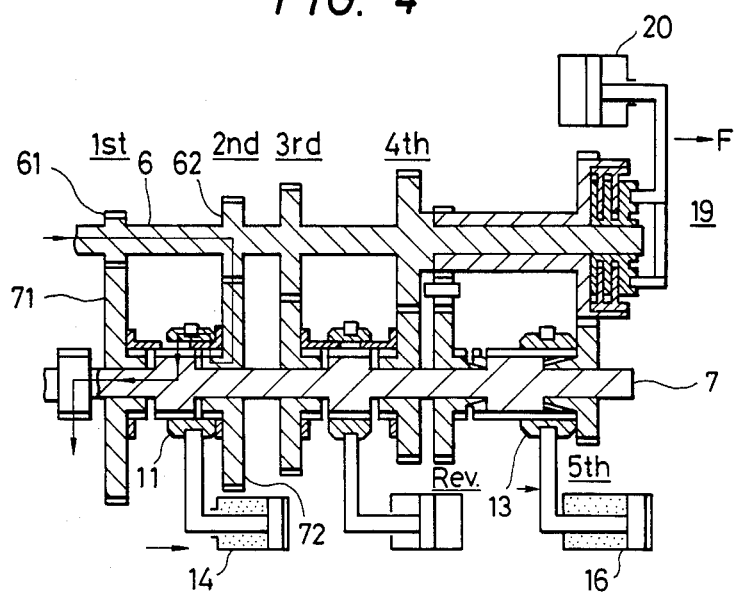

When this connection is completed, the pressure oil supply to the actuator 20 is stopped to release the thrust F of the multi-disk clutch 19. Thus, the shift of the position from the first speed running to the second speed running is completed. The engine output at this time has the transmission path of the input shaft 6—the gear 62—the gear 72—the sleeve 11—the output shaft 7, as shown in FIG. 4 by the thin line.

As has been described above, the gear position shift from the first speed to the second speed is achieved through the neutral state. Since, however, the transmission of the engine output to the axle during the gear position shift is effected by the multi-disk clutch 19 and the fifth-speed gear pair 65 and 75, the driver is not required to release the accelerator pedal 3 so as to adjust the engine output. Thus, the position shift of the gear transmission can be accomplished while accelerating the automobile. In case the driver releases the accelerator pedal 3 during the position shift of the transmission 4 in the same way as he does so far, on the other hand, the rotational synchronism between the input shaft 6 and the output shaft 7 by the multi-disk clutch 19 is advanced moreover, because the number of revolutions of the engine 1 is dropped early. This is more suitable for the operation of the gear position shift.

The gear position shift to the third and fourth speeds can be accomplished similarly. In the case of the gear position shift to the fifth speed, this can be achieved by maximizing the thrust F produced by the actuator 20 and by setting other sleeves 11 and 12 at the neutral positions.

Figure 5:
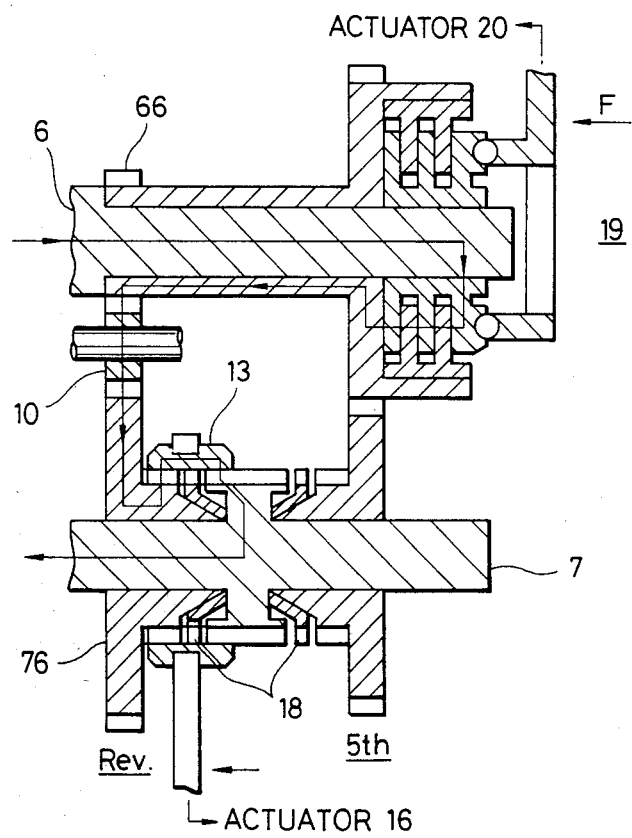

FIG. 5 shows the operation for the reverse range. For this operation, the sleeve 13 is moved leftward oppositely of FIGS. 2 to 4 by the actuator 16 to connect the output shaft 7 and the gear 76 ("R sleeve ON"). In this case, too, the connection can be effected independently of the state of the output shaft 7 by the action of the synchromesh 18. Here, by thrusting the friction disks of the multi-disk clutch 19, this multi-disk clutch 19 is turned so that the gear 76 is turned through the gears 66 and 10 to rotate the output shaft 7 in the reverse direction.

In case the reduction ratio is increased, namely the gear position of the transmission 4 is shifted down, for example, from the second speed position to the first speed position, the sleeve 11 in a position as shown in FIG. 4 is at first moved leftward to the neutral position to release the connection of the gear 72 and the output shaft 7 ("second sleeve OFF"). At the same time, the actuator 20 is supplied with the pressure oil to actuate the multi-disk clutch 19. The path for the transmission of the engine output is changed from the path shown in FIG. 4 to that as shown in FIG. 2. In this condition, the thrust F in the multi-disk clutch 19 is decreased so that the load of the engine 1 is made light and accordingly the number of revolutions thereof increases. When the ratio of the number of revolutions of the input shaft 6 and the output shaft 7 approaches the ratio of the first speed position determined by the gear pair 61 and 71 in accordance with the increase of the number of revolutions of the engine 1, the actuator 14 moves the sleeve 11 leftward from the neutral position so that the gear 71 is operably coupled with the output shaft 7 ("first sleeve ON"). Therefore, the transmission path of the engine output becomes as shown in FIG. 3, that is the condition of the first speed position.

The foregoing description is directed to the operations of the mechanical portion of the embodiment of FIG. 1. These operations are controlled by the control apparatus 21 and will be described in detail hereinafter, referring to flow charts of FIGS. 6 to 11 showing all of those controls.

Figure 6:
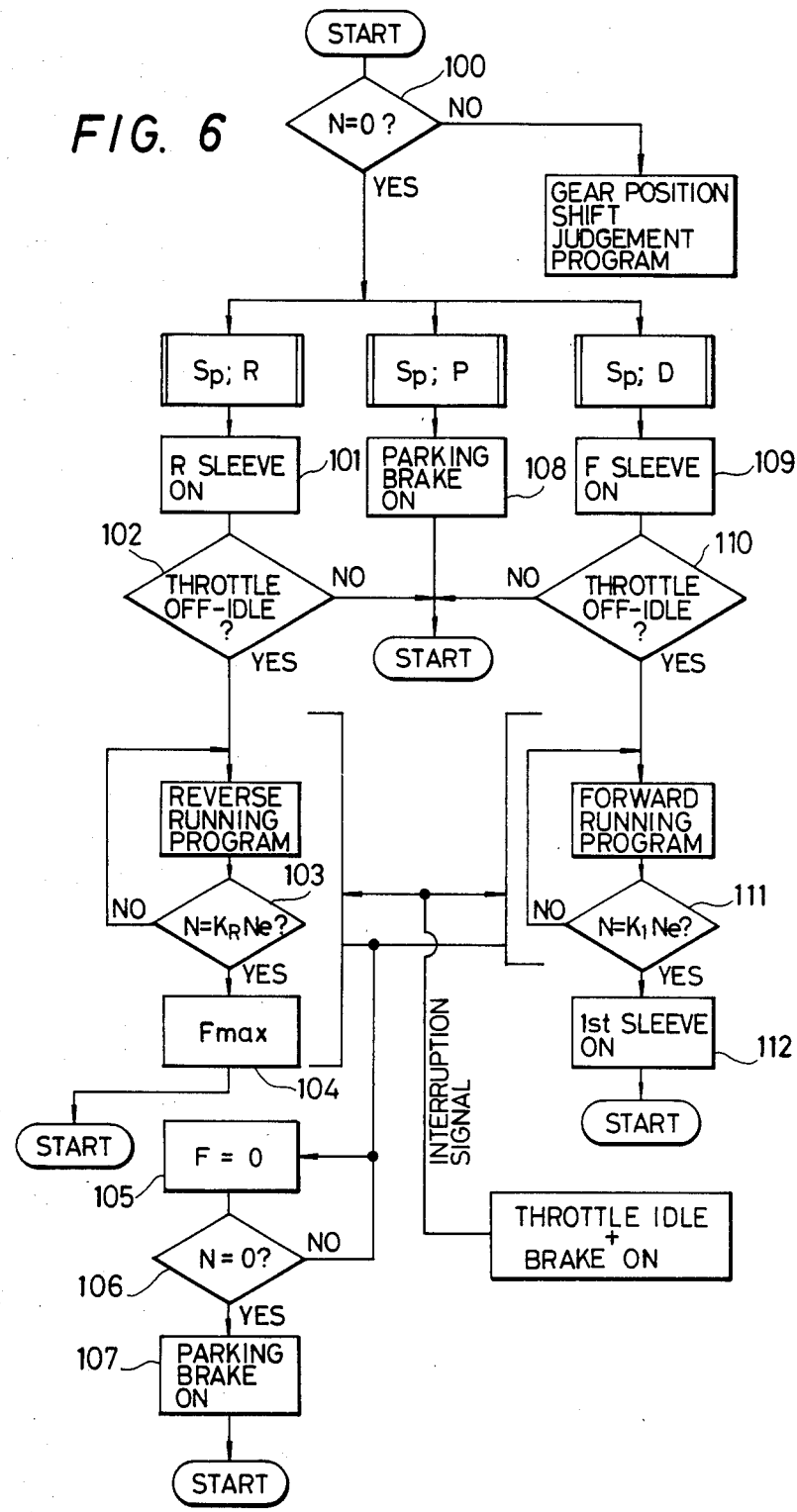
FIG. 6 is a flow chart showing wholly the control method according to the embodiment of the present invention.

First of all, FIG. 6 is the flow chart showing the control for the starting operation. In FIG. 6, the running speed N is first judged at step 100. If N=0 (i.e., in the still state), the start program shown in the figure is executed. For N≠0, on the contrary, the program is jumped to a gear position shift judgement program described later in reference to FIG. 7. In the case of the start, the driver selects one of the R, P and D ranges through the selector 26. In the description hereinafter, the position of the selected range of the selector 26 is referred to by the reference character $S_p$. For example, the expression $[S_p; D]$ means that the driver selects the drive range of the selector 26. The same is true of other expression $[S_p; R]$, $[S_p; P]$, $[S_p; 1st]$, $[S_p; 2nd]$, and $[S_p; 3rd]$. By the way, the reference charactor $T_p$ is used in the description later. This is utilized for indicating the position of the selected gear pair of the transmission 4. Attention should be paied in order to avoid the confusion, especially between [$S_p$; 1st] and [$T_p$; 1st], for example.

Now, assuming that the driver selects the reverse range [$S_p$; R] through the selector 26. At this time, a signal is given to the actuator 16 from the control apparatus 21 so that the actuator 16 is supplied with the pressure oil so as to move the sleeve 13 leftward, i.e. to the reverse (R) side ("R sleeve ON"). This movement is conducted at step 101 in FIG. 6 (since the movement of the mechanical portion of the transmission 4 has been described hereinbefore, the correlation with the mechanism will be stated briefly in the following).

Here, if it is confirmed in terms of the off-idle of the throttle valve 2 at step 102 that the driver has depressed the accelerator pedal 3, a later-described (with reference to FIG. 11) reverse program is started and executed. The execution of the reverse program is continued until $N=K_R \times N_e$, wherein N denotes the number of revolutions of the output shaft 7 proportional to the running speed of the automobile, Ne the number of revolutions of the input shaft 6 corresponding to that of the engine 1, and $K_R$ the reverse reduction ratio determined by a set of gears 66, 76 and 10 for the reverse running. If it is confirmed at step 103 that the condition holds, the thrust F of the multi-disk clutch 19 is maximized (at step 104), and the start program is ended, and the operation is returned to the start of the program.

If the throttle valve 2 is brought to the idle position and the brake is applied during the execution of the reverse program, an interruption signal is produced to interrupt the reverse program so that the operation is jumped to step 105 to effect F=0. If it is subsequently confirmed at step 106 that N=0 (namely, the automobile stands still), the parking brake is applied at step 107, and the operation is returned to the start of the program.

When the parking range [$S_p$; P] is selected by the selector 26, the parking brake is applied at step 108, and the operation is returned to the start of the program.

When the drive range [$S_p$; D] is selected by the selector 26, the sleeve 13 is moved at step 109 to the forward side, which is expressed as "F sleeve ON". Here, if the throttle valve 2 is depressed (step 110), the program is shifted to a later-described drive program (FIG. 11), and this drive program is started. If the drive program is executed, the number of revolutions of the engine $N_e$ is increased. When the equation $N=K_1 \times N_e$ is satisfied at step 111, wherein $K_1$ is the reduction ratio determined by the gear pair 61 and 71 for the first speed position of the transmission 4, the operation is advanced to step 112 which is labeled by "first sleeve ON". When the "first sleeve ON" at step 112 is completed, the operation returns to the start of the program so that the automobile continues to run at the speed determined by the relation of the number of revolutions of the engine $N_e$ and the reduction ratio $K_1$.

Here, too, if the throttle valve 2 is released to the idle position and the brake is applied during the execution of the drive program, the interruption signal is fed so that the operation is jumped to step 105 and later. The operation after step 105 is the same as described before.

The description above relates to the operation in which the automobile starts the reverse running or the forward running from its standstill condition. Next, the explanation will be made of the operation under the condition that the automobile continues to run. In case the automobile is running, the program is shifted at step 100 to the gear position shift judgement program as shown in FIG. 7, and this judgement program is executed.

Figure 7:
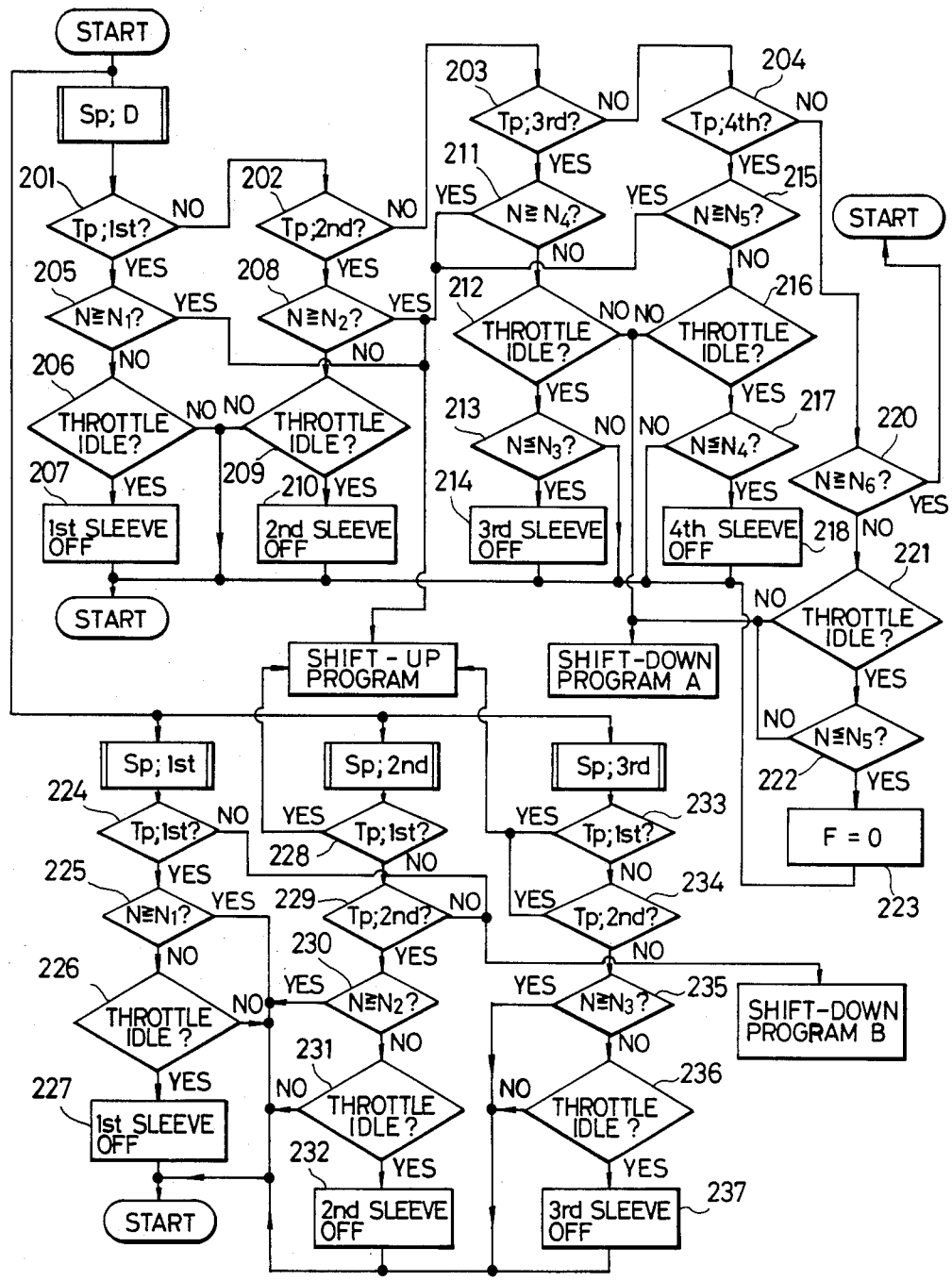
FIG. 7 is a flow chart, showing the gear position shift judgement program.

FIG. 7 is a flow chart showing the gear position shift judgement program, in which the selector 26 is at one of the selector positions [$S_p$; D, 1st, 2nd and 3rd]. If the D range [$S_p$; D] is selected, the shift position $T_p$ of the transmission 4 at present is judged at steps 201 to 204.

Figure 8:
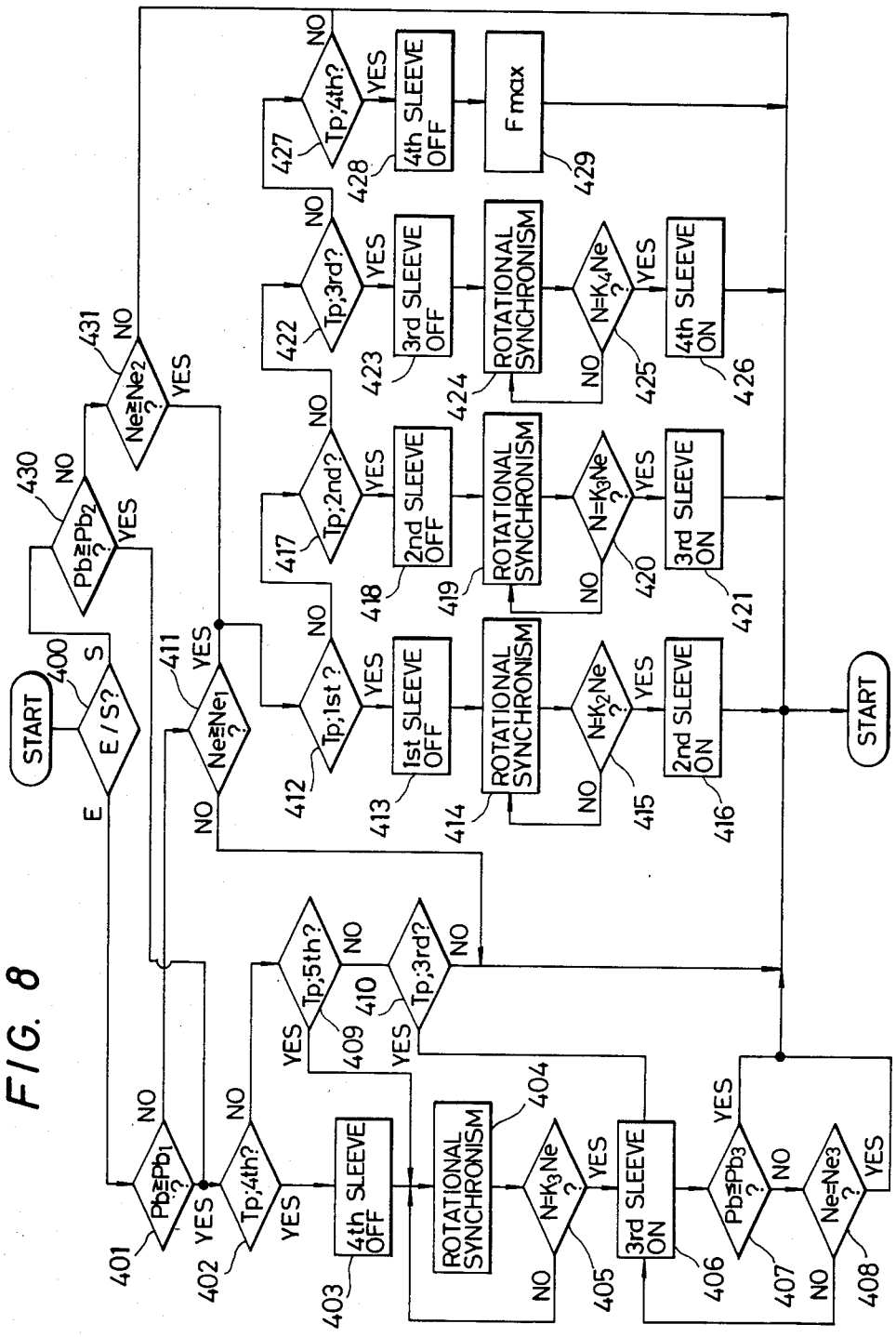
FIG. 8 is a flow chart showing the shift-up program.

In the case of [$T_p$; 1st], if N is smaller than $N_1$ and if the throttle valve 2 is at the idle position (at steps 205 and 206), the sleeve 11 returns to the neutral position to release the connection of the output shaft 7 and the gear 71 for the first speed position [$T_p$; 1st] (at step 207). The automobile is brought to a stoppable state thereby, and the operation is returned to the start of the program. $N_1$ described above, denotes the predetermined number of revolutions of the output shaft 7, which is proportional to the running speed of the automobile. The meaning of $N_1$ is explained later in reference to FIG. 12. Here, if the driver applies the brake, the automobile can be stopped without any engine stop. If the throttle valve 2 is opened, the operation is returned from step 206 to the start of the program to continue the running state of the first speed position [$T_p$; 1st] of the transmission 4. In case the running speed N is equal to or higher than $N_1$, the operation is jumped from step 205 to a later-described shift-up program (FIG. 8).

In the case of [$T_p$; 2nd] (at step 202), the operations are similar to those of the first speed position [$T_p$; 1st] described above (at steps 208 to 210). This is because the acceleration can be effected by opening the throttle valve 2 if the automobile is running at the first or second speed positions [$T_p$; 1st or $T_p$; 2nd] of the transmission 4. In this case, $N_2$ is also the predetermined value of the number of revolutions of the output shaft 7, which is larger than $N_1$ and described in detail later.

In case $T_p$ is at the third speed position [$T_p$; 3rd], the operation is shifted from step 211 to the shift-up program if N is higher than $N_4$. If the throttle valve 2 is opened in the state of N lower than $N_4$, on the other hand, the operation is jumped from step 212 to a later-described shift-down program A. If the throttle valve 2 is in the idle position and if N becomes lower than $N_3$, the operation is shifted from step 213 to step 214, in which step the sleeve 12 is moved to the neutral position to release the connection of the output shaft 7 and the gear 73 for the third-speed position and the operation is returned to the start of the program.

In the case of [$T_p$; 4th], the operations to be conducted are similar to those for [$T_p$; 3rd] (at steps 215 to 218). In case $T_p$ is not [$T_p$; 4th], the thrust F is judged as the maximum value $F_{max}$. The gear shift position is judged to be the fifth speed position [$T_p$; 5th]. In case the gear shift position is the fifth speed position [$T_p$; 5th] and in case N is higher than $N_6$, the operation is returned from step 220 to the start of the program because the usual acceleration can be conducted. In case N is lower than $N_6$ with the throttle valve 2 being other than in the idle position, the program is shifted from step 221 to the shift-down program A. If N becomes lower than $N_5$ in the idle position, the operation is shifted from step 222 to step 223, and the operation is returned to the start with the neutral state of the thrust F=0.

By the way, there is a case where the driver selects one of the selector positions [$S_p$; 1st], [$S_p$; 2nd] and [$S_p$; 3rd] during the running of the automobile. This is, for example, because the driver expects the so-called engine brake in the running of a down hill. In such a down hill running, the speed of the automobile increases gradually. If the selector 26 is kept at the drive range [$S_p$; D], the gear shift position $T_p$ of the transmission 4 becomes higher automatically as the increase of the speed, e.g. from [$T_p$; 2nd] to [$T_p$; 3rd], from [$T_p$; 3rd] to [$T_p$; 4th], and so on. Namely, the reduction ratio becomes smaller and smaller so that the engine brake to be expected takes effect less and less. If, however, the position $S_p$ of the selector 26 is selected at the range other than the drive range [$S_p$; D], the advance of the gear shift position $T_p$ is limited up to the position $T_p$ determined by or corresponding to the selected position $S_p$. If [$S_p$; 2nd] is selected for example, the gear shift position does not advance beyond [$T_p$; 2nd].

The explanation hereinafter will be made of the operation where the driver selects the selector position other than [$S_p$; D]. When the driver selects the first-speed range [$S_p$; 1st] by the selector 26, the judgement of $T_p$ is first conducted (at step 224). In the case of [$T_p$; 1st], the operation is shifted to step 225 to judge $N \geq N_1$. In the case of $N \geq N_1$, the operation is returned to the start of the program, and the running under the first speed position [$T_p$; 1st] is continued. In case $N < N_1$, the operation advances to step 226. Now, when the throttle valve 2 takes the idle position (at step 226), the sleeve 11 moves from the first speed position [$T_p$; 1st] to the neutral position ("first sleeve OFF" at step 227) and the operation is returned to the start of the program while preventing the engine stop. In case the $T_p$ is not the first speed position, [$T_p$; 1st], the shift-down program B is executed in order to effect the first speed position of the transmission 4.

When the driver selects the second-speed range [$S_p$; 2nd] by the selector 26, the $T_p$ is judged at step 228. In the case of [$T_p$; 1st], the shift-up program is executed. In the case of [$T_p$; 3rd], but neither [$T_p$; 1st] nor [$T_p$; 2nd], the operation is subsequently jumped from step 229 to the shift-down program B, and this program is executed. In case the $T_p$ is the second speed position [$T_p$; 2nd], the sleeve 11 in the second speed position [$T_p$; 2nd] is moved to the neutral position ("second sleeve OFF" at step 232) to effect the neutral state in case $N < N_2$ (at step 230) and in case the throttle valve 2 is at the idle position (at step 231).

When the driver selects the third-speed range [$S_p$; 3rd] by the selector 25, the operation is jumped to the shift-up program (at steps 233 and 234) in the case of [$T_p$; 1st] and [$T_p$; 2nd]. In the case of [$T_p$; 3rd], the sleeve 12 in the third speed position is moved to the neutral position ("third sleeve OFF" at step 237) in case $N$ is smaller than $N_3$ (at step 235) and in case the throttle valve 2 is at the idle position (at step 236).

When one of 1st, 2nd and 3rd of the position $S_p$ of the selector 26 is thus selected, the gear shift position $T_p$ of the transmission 4 is changed to the position $T_p$ corresponding to the $S_p$ selected and is subsequently held. In these ways, the braking effect by the engine and the running state for a long uphill can be covered.

FIG. 8 is a flow chart of the shift-up program which has been referred to in FIG. 7. Although this flow chart is named the "shift-up" program, it includes the "kick-down" program which is used, when the driver has pressed down the acceleration pedal 3 deeply for the rapid acceleration during the running of the automobile at the relatively high speed.

Assuming at first that the driver selects the E range (i.e. economy drive) by the switching lever 27. Then, the operation advances from step 400 to step 401, at which an intake pressure $P_b$ detected by the intake pressure sensor 23 is judged. If $P_b \geq P_{b1}$ is judged, this fact means that the driver demands the rapid acceleration to open the throttle valve 2 by pedaling deeply. In this case, if it is judged at step 402 that the automobile is running under the fourth speed position [$T_p$; 4th] of the transmission 4, the kick-down program described below is executed.

The sleeve 12 in the fourth speed position [$T_p$; 4th] is moved to the neutral position ("fourth sleeve OFF" at step 403), and the rotational synchronism of the input shaft 6 and the output shaft 7 is done by the control of the thrust F (at step 404). If $N = K_3 N_e$ holds (at step 405), the sleeve 12 in the neutral position is moved to the third speed position [$T_p$; 3rd] ("third sleeve ON" at step 406). Hence, the number of revolutions of the engine 1 increases and accordingly the intake pressure $P_b$ is decreased. If the intake pressure $P_b$ decreases sufficiently so that it is sensed at step 407 that $P_b$ is equal to or smaller than $P_{b3}$; the operation is returned to the start of the program. Here, $|P_{b1}| < |P_{b3}|$, but attention is to be paid to that the intake pressure $P_b$ is of a negative pressure. If $P_b > P_{b3}$, on the contrary, the running under the third speed position [$T_p$; 3rd] of the transmission 4 is continued until $N_e = N_{e3}$ (at step 408).

In case $T_p$ is not the fourth speed position [$T_p$; 4th] but the fifth speed position [$T_p$; 5th], the operation advances from step 409 to step 404. Subsequently, the thrust F is controlled to effect the rotational synchronism, and the running under the third speed position [$T_p$; 3rd] is entered. In case the $T_p$ is the third speed position, the operation is shifted from step 410 to step 406, and no speed change is effected before $P \leq P_{b3}$ or $N_e = N_{e3}$. In the case of the second or the first speed positions [$T_p$; 2nd] or [$T_p$; 1st], the normal running is continued without any kick-down operation.

In the kick-down program, as described above, when the rapid acceleration is demanded, the shift-down of the position $T_p$ occurs if $T_p$ at that time is the fourth or the fifth, and does not occur if $T_p$ is less than the fourth. This is because the reduction ratio of the gear pairs for the fourth and fifth positions is too small to transmit the sufficient power for the rapid acceleration demanded from the engine 1 to the axle.

In case the relation of $P_b \geq P_{b1}$ does not hold at step 401, it is judged that the acceleration is normal, and no shift of the position $T_p$ is conducted unless $N_e \geq N_{e1}$ so that the operation goes back to the start of the program from step 411. If $N_e \geq N_{e1}$, the shift-up of the position $T_p$ is performed to the second speed position [$T_p$; 2nd] in case the present $T_p$ is the first (steps 412 to 416); to the third speed position [$T_p$; 3rd] in case the present $T_p$ is the second (steps 417 to 421); and to the fourth speed position [$T_p$; 4th] in case the present $T_p$ is the third (steps 422 to 426).

The shift-up operation up to the fourth speed position [$T_p$; 4th] described above is basically the same, as is apparent from the formation of blocks of the flow chart in FIG. 8. The detailed explanation, therefore, is made of the case of the shift-up operation from the third speed position [$T_p$; 3rd] to the fourth speed position [$T_p$; 4th] as a typical example thereof.

If it is judged at step 422 that $T_p$ at the present time is the third speed position [$T_p$; 3rd], the sleeve 12 in the side of the third speed position is moved to the neutral position ("third sleeve OFF" at step 423). At the same time, the rotational synchronism of the input and output shafts 6, 7 is begun by adjusting the thrust F in the multi-disk clutch 19 (at step 424). This is taken place until $N=K_4N_e$, and if this relation is completed (at step 425), the sleeve 12 in the neutral position is moved to the side of the fourth speed position ("fourth sleeve ON" at step 426). The operation is returned to the start of the program and the running under the fourth speed position [$T_p$; 4th] is kept.

In case the present $T_p$ is the fourth speed position, the shift-up operation is somewhat different from that stated above, as understood from steps 427 to 429 in FIG. 8. If $T_p$ is the fourth speed position, the sleeve 12 in the side of that speed position [$T_p$; 4th] is moved to the neutral position ("fourth sleeve OFF" at step 428). At the same time, the thrust F in the multi-disk clutch 19 is maximized at step 429. The output power of the engine 1, therefore, is transmitted from the input shaft 6 to the output shaft 7 through the path of the shaft 6—the friction disks of the clutch 19—the gear 65—the gear 75—the sleeve 13—the shaft 7. This means that the operation has entered into that of the fifth speed operation [$T_p$; 5th]. If it is judged that the present $T_p$ is not the fourth speed position, and therefore the fifth speed position is now under the operation, there is no necessity for the shift-up operation.

If the driver selects the S range (i.e. sporty drive) by the switching lever 27, the reference value for the kick-down condition becomes large to $|P_{b2}|$ ($>|P_{b1}|$, but $<|P_{b3}|$) (at step 430). The $T_p$ position for the kick-down is located at the fourth and fifth speed positions in the same manner as that of the E range described before. The number of revolutions of the engine $N_e$ for the gear shift position is set highly at $N_{e2}$ ($>N_{e1}$) (at step 431). The engine, therefore, can be used at a larger number of revolutions than that in a case of the E range.

Figure 9:
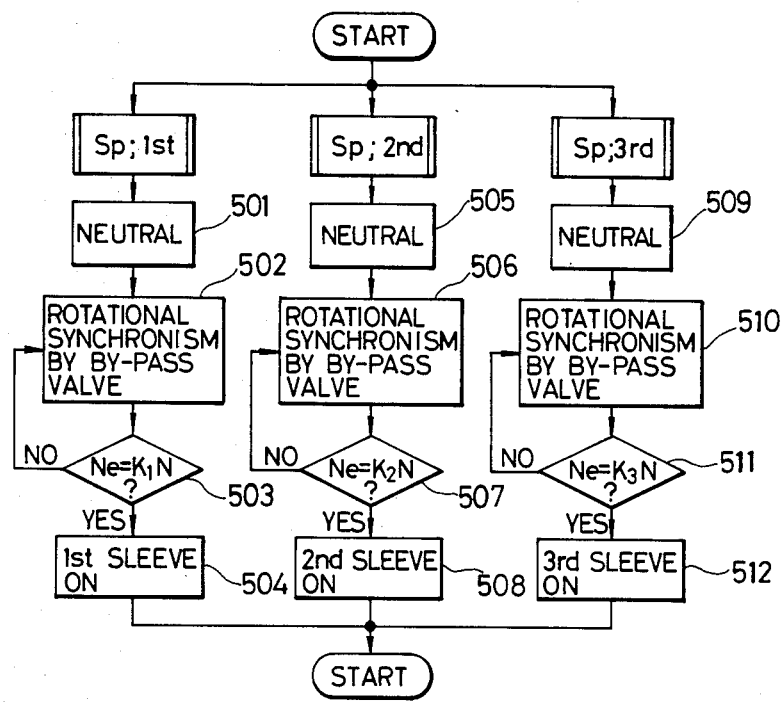
FIG. 9 is a flow chart showing the shift-down program B.

FIG. 9 is a flow chart showing the shift-down program B. This shift-down program B is a control program in case the driver shifts the select lever 26, for example, from [$S_p$; 3rd] to [$S_p$; 2nd] or from [$S_p$; 2nd] to [$S_p$; 1st] while the automobile is running. The shift-down program B is used in case the braking effect by the engine 1 is to be enhanced while the automobile is running downhill.

As understood from the flow charts of FIGS. 7 and 8 and the description relating thereto, in case the driver keeps the selector range at the position [$S_p$; D] during the downhill running, the gear shift position $T_p$ of the transmission 4 is automatically advanced higher and high (i.e. the reduction ratio becomes smaller and smaller) so that the braking effect by the engine 1 becomes insufficient. If the driver leaves such condition as it is, $T_p$ will be advanced up to the fourth or fifth. In such high position of $T_p$, the engine brake can be scarcely expected. For the purpose of avoiding such condition, the driver usually shifts the position $T_p$ down to the lower (i.e. the reduction ratio is made larger thereby).

In the transmission of such a type as the present embodiment is applied to, the shift-down of $T_p$ can be achieved by selecting the selector position $S_p$ from among 1st, 2nd and 3rd. If the position [$S_p$; 3rd] is selected, the advance of $T_p$ is limited up to [$T_p$; 3rd]. The same is true of two other selector positions. Further, there is a case where the running speed becomes excessively high, even if the driver shifts the selector position from [$S_p$; D] to [$S_p$; 3rd]. In such a case, the selector position $S_p$ must be further shifted down to [$S_p$; 2nd]. If, in this case, the driver depresses the accelerator pedal 3, the number of revolutions of engine $N_e$ is increased so that the multi-disk clutch 19 can be rotationally synchronized (according to the shift-down program A described after). Because of the downhill, however, the driver usually does not press down the accelerator pedal 3 and therefore the throttle valve 2 is at its idle position. It is, therefore, necessary that the number of revolutions of the engine $N_e$ be controlled to effect the rotational synchronism by something else. In this embodiment, a pneumatic valve (e.g., an idle speed control valve) by-passing the throttle valve 2 is used for this purpose. The by-pass valve is controlled by the by-pass valve controller 30 in response to the signal from the control apparatus 21 (cf. FIG. 1).

Referring to FIG. 9, assuming that the selector position [$S_p$; 1st] is selected. First of all, every sleeve under the operation at that time is moved to the neutral position to effect the perfect neutral condition of the output shaft 7 (at step 501). After that, by controlling the opening of the by-pass valve, the number of revolutions of the engine $N_e$ is increased (at step 502). This operation is continued until $N_e=K_1N$. If the relation $N_e=K_1N$ is completed (at step 503), the sleeve 12 in the neutral position is moved to the first speed position ("first sleeve ON" at step 504), and the operation is returned to the start of the flow.

As becomes apparent from the formation of blocks of the flow chart, the similar operations are performed in the cases of the selection of [$S_p$; 2nd] or [$S_p$; 3rd]. The explanation thereof is omitted.

Figure 10:
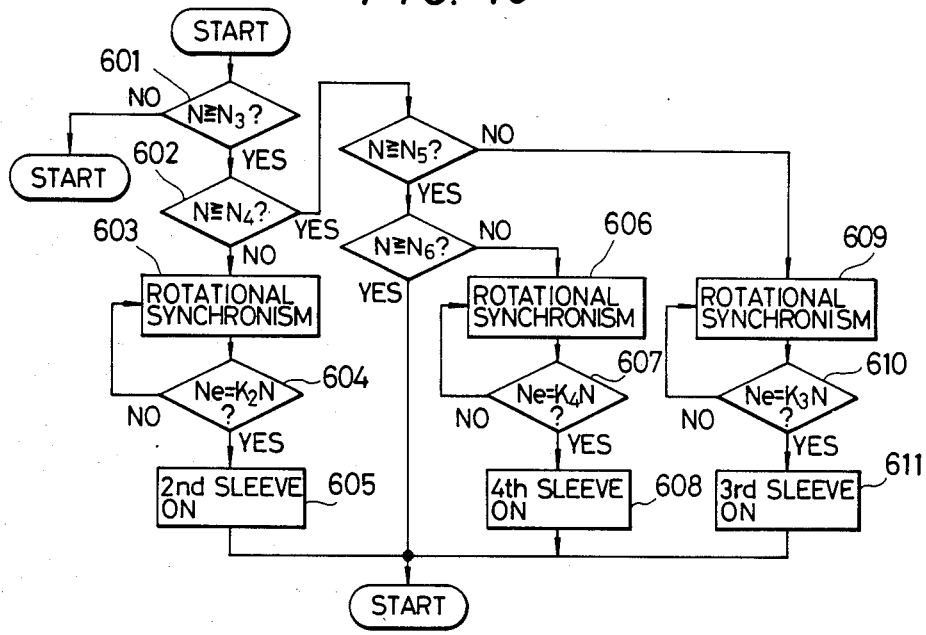
FIG. 10 is a flow chart showing the shift-down program A.

FIG. 10 is a flow chart showing the shift-down program A. This shift-down program A is executed in case the running speed of the automobile decreases with the transmission 4 being kept in the operably connecting state and, from that condition, the automobile is accelerated again. Since, when the opening of the throttle valve 2 is large (the drop of the intake vacuum is high, i.e. $P_b \geq P_{b1}$), the kick-down operation is effected as described before, the shift-down program A can be called the program for a relatively slow acceleration. The running mode at this time belongs to the D range of the selector position $S_p$.

If $N<N_3$ (at step 601), as shown in FIG. 10, the position $T_p$ of the transmission 4 is at the first or second speed position [$T_p$; 1st or 2nd] and the automobile can be accelerated with that position $T_p$ so that the operation is returned to the start of the program.

In the case of $N_3 \leq N < N_4$, the running under the second speed position [$T_p$; 2nd] is effected by executing steps 602 and 603 to 605. Likewise, the position $T_p$ of the transmission 4 is the third [$T_p$; 3rd] (steps 609 to 611) in the case of $N_4 \leq N < N_5$, and is the fourth [$T_p$; 4th] (at steps 606 to 608) in the case of $N_5 \leq N < N_6$. The running under the fifth speed position [$T_p$; 5th] is continued in the case of $N \geq N_6$.

Figure 11:
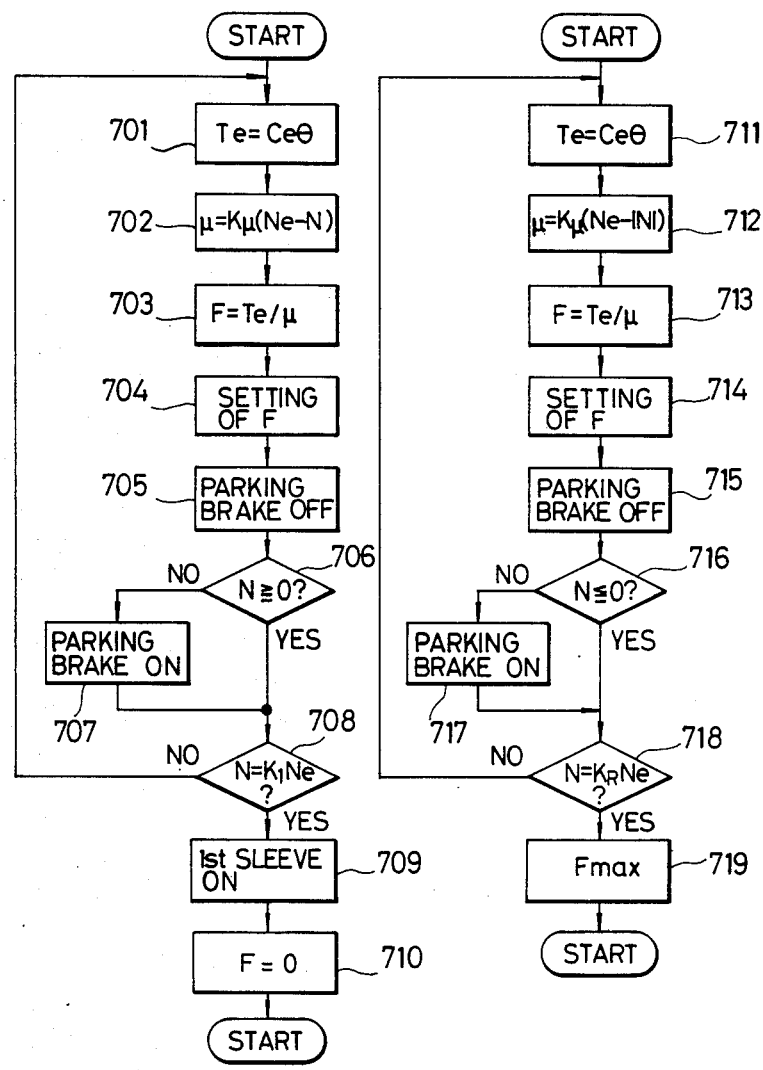
FIGS. 11(a) and (b) are flow charts showing the forward running program and the reverse running program.

FIGS. 11($a$) and ($b$) show the forward running program and the reverse running program, respectively. The present invention is characterized in that the running speed and the number of revolutions of the engine 1 for the start and the speed change are controlled by controlling the torque transmission force of the multi-disk clutch 19. Generally, the relationship between an engine output torque $T_e$ and an output torque T of the transmission 4 is expressed by:

$$I \cdot dw/dt = T_e - T \qquad (1)$$

The difference between $T_e$ and T appears as the change of the angular velocity w of the engine 1. Here, I designates the efficiency of inertia of the engine 1. On the other hand, the torque transmitted by the clutch 19 is expressed by:

$$T = \mu F \quad (2)$$

wherein $\mu$ designates a coefficient according to the rotational difference among the friction disks and F designates the thrusting force applied to the friction disks.

If the driver opens the throttle valve 2 to an opening $\theta$, as shown in FIG. 11(a), the engine output $T_e$ is calculated at step 701 for a certain constant $C_e$ by:

$$T_e = C_e \cdot \theta \quad (3)$$

If the engine output $T_e$ and the transmission torque T of the multi-disk clutch 19 are set to satisfy $T_e = T$, the engine acceleration term $(I \cdot dw/dt)$ of the equation (1) is transmitted to the axle so that the automobile can be started without any drop of the number of revolutions of the engine 1 (or without any engine stop). Next, the coefficient $\mu$ of the equation (2) is calculated (at step 702) from $\mu = K_\mu (N_e - N)$, and the thrusting force F of the multi-disk clutch 19 is calculated (at step 703) from $F = T_e/\mu$.

From this result, the force F is set (at step 704). Here, the parking brake 28 is released (at step 705), and the state of the N is judged (at step 706). In case N is minus (i.e., the automobile begins to move backward), the parking brake is applied (at step 707), and it is judged (at step 708) that $N = K_1 N_e$. Because of "no" in this case, the operation is returned to the start, and the setting of the force F is changed again. In the forward running program, as shown in FIG. 6, the operations are started for the throttle valve 2 being of off-idle (i.e., under the opened condition of the throttle valve 2). As a result, the setting of the force F is gradually increased with the throttle valve opening $\theta$, and the term $(I \cdot dw/dt)N$ becomes plus so that the automobile can be started. For $N = K_1 N_e$, the sleeve 11 is moved to the side of the first speed position (at step 709) and the thrusting force F is brought to zero (at step 710) to effect the running under the first speed position $[T_p; 1st]$.

FIG. 11(b) shows the reverse running program. This program is basically identical to the forward running program but is different in that the parking brake is released for the minus N (at step 716). After the equation $N = K_R N_e$ holds (at step 718), moreover, the force F is set at the maximum (at step 719).

Figure 12:
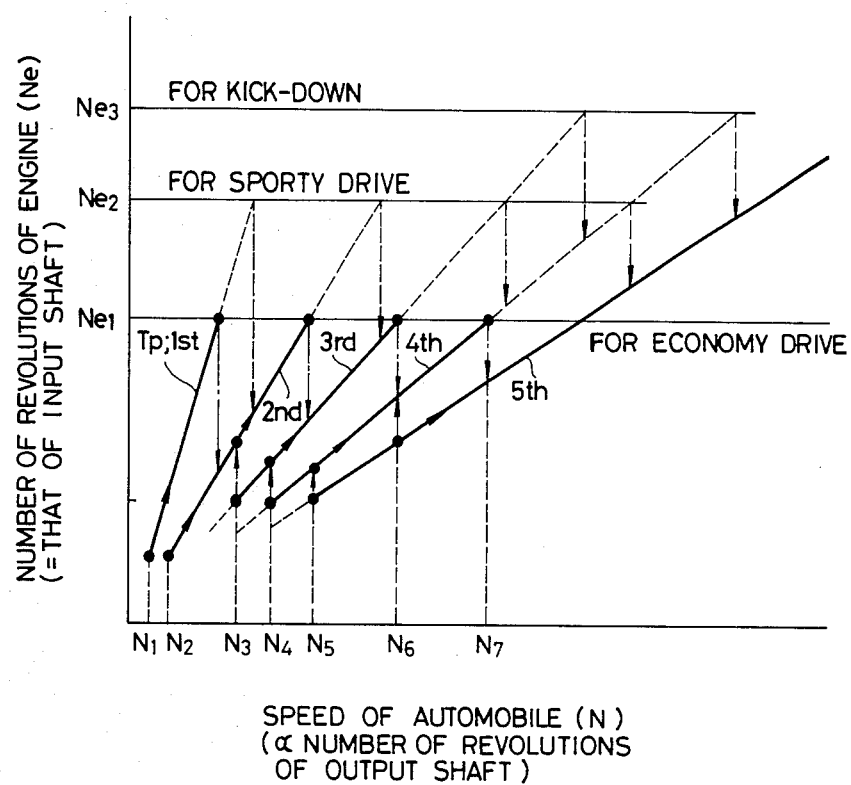
FIG. 12 is a diagram for explaining the relationship between the running speed and the number of revolutions of the engine.

FIG. 12 is a diagram showing one example of the relationship between the running speed N and the engine speed $N_e$. An explanation will be made by taking up the case of the fourth speed position $[T_p; 4th]$ as an example. For the E range (economy drive), $T_p$ is changed from the third $[T_p; 3rd]$ to the fourth $[T_p; 4th]$ at $N = N_6$ and varies with the relation of $N = k_4 N_e$. Now, when $N_e = N_{e1}$, the running speed is changed from the fourth $[T_p; 4th]$ to the fifth $[T_p; 5th]$. For the S range (sporty drive), $T_p$ is changed to the fifth $[T_p; 5th]$ at $N_e = N_{e2}$. In case $N \geq N_5$ in the running state under $[T_p; 4th]$, $T_p$ is not shifted down but the acceleration is done. In case $N_4 < N \leq N_5$, $T_p$ is shifted down to the third $[T_p; 3rd]$. In case $N \leq N_4$ with the throttle valve 2 being in the idle position, the speed position comes to the neutral. Upon the kick-down operation, the running state under $[T_p; 4th]$ is continued until $N_e = N_{e3}$, and $T_p$ is changed to the fifth $[T_p; 5th]$.

As is apparent from the embodiment thus far described, according to the present invention, the gear transmission can have its speed shift position changed without reducing the engine output. As a result, the running speed during the speed position shifting operation is less fluctuated. Moreover, the present invention has an effect that the using time of the clutch is shortened to improve the durability because the torque is transmitted through the clutch only during the speed position shifting and the running under the fifth speed position.

We claim:

1. An automatic transmission for an automobile comprising;
    a first and a second shaft, one of which is connected to an engine of the automobile and the other is connected to a load;
    a plurality of gear pairs having different reduction ratios only one pair of which is selected and conducts the torque transmission between said first and second shafts;
    a torque transmitting means provided between said first and second shafts for sharing the torque transmission at least during the change of the selection of said gear pairs, the degree of the torque transmitted being adjustable in accordance with the condition of the operation of the engine and the load; and
    a control means which receives signals representative of the condition of the operation of the engine and the load and outputs signals for selecting the gear pair and adjusting the degree of the torque transmission of said torque transmitting means wherein, when the ratio of the number of revolutions between said both shafts becomes substantially equal to a predetermined value, one of said gear pair having the reduction ratio corresponding to the predetermined value of said ratio of the number of revolutions is selected to effect the torque transmission between said both shafts.

2. An automatic transmission for an automobile according to claim 1, wherein said torque transmitting means comprises a multi-disk type clutch having;
    two groups of plural friction disks one group of which is fixedly provided on one of said both shafts and the other is fixedly provided on the other shaft, friction disks of each group being superposed alternately to those of the other group; and
    a thrusting mechanism applying the thrusting force to said plural friction disks, in which the thrusting force is controlled in response to the signal from said control means to adjust said degree of the torque transmission.

3. An automatic transmission for an automobile according to claim 2, wherein said multi-disk type clutch includes one of the gears belonging to one of said gear pairs.

4. An automatic transmission for an automobile according to claim 3, wherein said one of the gear pairs has the smallest one among the reduction ratios of a plurality of said gear pairs.

5. An automatic transmission for an automobile according to claim 1, wherein, during the change of the selection of said gear pairs, said control means;
    causes said torque transmitting means to operate to effect a rotational synchronism between said both shafts; and
    makes one of said gear pairs to be selected operable between said both shafts when the rotational synchronism is substantially completed.

6. An automatic transmission for an automobile according to claim 5, wherein said control means;
  causes said torque transmitting means to operate in accordance with the degree of the torque transmission determined by the output torque of the engine and the difference in the number of revolutions between said both shafts;
  compares the ratio of the numbers of revolutions of said both shafts with the reduction ratio of the gear pair to be selected under the condition of the determined degree of the torque transmission; and
  makes the gear pair to be selected operable between said both shafts when the ratio of the numbers of revolutions of said both shafts becomes substantially equal to the reduction ratio.

7. An automatic transmission for an automobile according to claim 5, wherein the rotational synchronism is performed by by-passing a throttle valve of the engine when the throttle valve is closed and the larger reduction ratio than that at present is required while the automobile is running.

* * * * *